(12) United States Patent
Wang et al.

(10) Patent No.: US 9,258,741 B2
(45) Date of Patent: Feb. 9, 2016

(54) CARRIER AGGREGATION ACKNOWLEDGEMENT BITS

(71) Applicant: Research In Motion Limited, Waterloo (CA)

(72) Inventors: Yiping Wang, Allen, TX (US); Robert Mark Harrison, Grapevine, TX (US); Jun Li, Richardson, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 163 days.

(21) Appl. No.: 13/764,718

(22) Filed: Feb. 11, 2013

(65) Prior Publication Data

US 2014/0036749 A1 Feb. 6, 2014

Related U.S. Application Data

(60) Provisional application No. 61/679,676, filed on Aug. 3, 2012.

(51) Int. Cl.
| | |
|---|---|
| *H04W 8/12* | (2009.01) |
| *H04L 1/16* | (2006.01) |
| *H04L 5/00* | (2006.01) |
| *H04W 28/12* | (2009.01) |

(52) U.S. Cl.
CPC .............. *H04W 28/12* (2013.01); *H04L 1/1614* (2013.01); *H04L 5/001* (2013.01)

(58) Field of Classification Search
None
See application file for complete search history.

(56) References Cited

U.S. PATENT DOCUMENTS

| 2012/0087437 | A1* | 4/2012 | Fong | 375/295 |
| 2012/0113876 | A1* | 5/2012 | Li et al. | 370/280 |
| 2012/0207107 | A1* | 8/2012 | Li et al. | 370/329 |
| 2013/0188535 | A1* | 7/2013 | Seo et al. | 370/280 |
| 2013/0195066 | A1* | 8/2013 | Lee et al. | 370/329 |
| 2013/0223296 | A1* | 8/2013 | Zeng et al. | 370/280 |
| 2013/0242922 | A1* | 9/2013 | Suzuki et al. | 370/329 |

(Continued)

FOREIGN PATENT DOCUMENTS

| WO | WO2012044045 A1 * | 4/2012 |
| WO | WO2012060433 A1 * | 4/2012 |
| WO | WO 2012060628 A2 * | 5/2012 |

OTHER PUBLICATIONS

ETSI TS 136 213 v10.1.0 (Apr. 2011), LTE; Evolved Universal Terrestrial Radio Access (E-UTRA); Physical layer procedures (3GPP TS 36.213 version 10.1.0 Release 10), Apr. 2011.*

(Continued)

*Primary Examiner* — Faruk Hamza
*Assistant Examiner* — Cassandra Decker
(74) *Attorney, Agent, or Firm* — Fish & Richardson P.C.

(57) ABSTRACT

Systems, methods, and user equipment can involve transmitting Acknowledgement/Negative Acknowledgement (ACK/NACK) bits for carrier aggregation between a first cell and a second cell in a User Equipment (UE). With the UE, for a sub-frame, a first number of ACK/NACK bits for the first cell can be compared with a second number of ACK/NACK bits for the second cell. If a first number of ACK/NACK bits for the first cell is less than a second number of ACK/NACK bits for the second cell, an ACK/NACK bit position from the first cell can be used to transmit an ACK/NACK bit for the second cell. In some implementations, one or more DTX bits can be used to set the number of ACK/NACK bits in the first cell equal to the number of ACK/NACK bits in the second cell.

7 Claims, 9 Drawing Sheets

(56) References Cited

U.S. PATENT DOCUMENTS

2013/0258978 A1* 10/2013 Aiba et al. .................... 370/329
2013/0308550 A1* 11/2013 Yin et al. ...................... 370/329
2013/0322358 A1* 12/2013 He et al. ....................... 370/329

OTHER PUBLICATIONS

ETSI TS 136 213 v10.1.0 (Apr. 2011), LTE; Evolved Universal Terrestrial Radio Access (E-UTRA); Physical layer procedures (3GPP TS 36.213 version 10.1.0 Release 10), Apr. 2011, p. 102-105.*
3GPP TS 36.211 v10.5.0: "Evolved Universal Terrestrial Radio Access (E-UTRA); Physical Channels and Modulation" Jul. 2012.
Final Report of 3GPP TSG RAN WG1 #66 v1.0.0, R1-112021; Athens, Greece, Aug. 22-26, 2011.
Final Report of 3GPP TSG RAN WG1 #66bis v1.0.0, R1-112886; Zhuhai, P. R. China, Oct. 10-14, 2011.
Final Report of 3GPP TSG RAN WG1 #67 v1.0.0, R1-114352; San Francisco, CA, USA, Nov. 14-18, 2011.
Final Report of 3GPP TSG RAN WG1 #68bis v1.0.0, R1-120951; Jeju, Korea, Mar. 26-30, 2012.
R1-122966, "Way forward on HARQ-ACK transmission for TDD inter-band CA," CATT, Ericsson, ST-Ericsson, Prague, Czech Republic, May 21-25, 2012.
Ericsson, ST Ericsson: "PUCCH Resource Mapping", 3GPP TSG-RAN WG1 #69; R1-121988, May 25, 2012.
3GPP Standard 3GPP TS 36.213, No. v10.1.0; Mar. 30, 2011.
International Search Report and Written Opinion issued in international No. PCT/US2013/025713 on May 21, 2013; 15 pages.
International Preliminary Report on Patentability in International Application No. PCT/US2013/025713, dated Feb. 3, 2015, 12 pages.

* cited by examiner

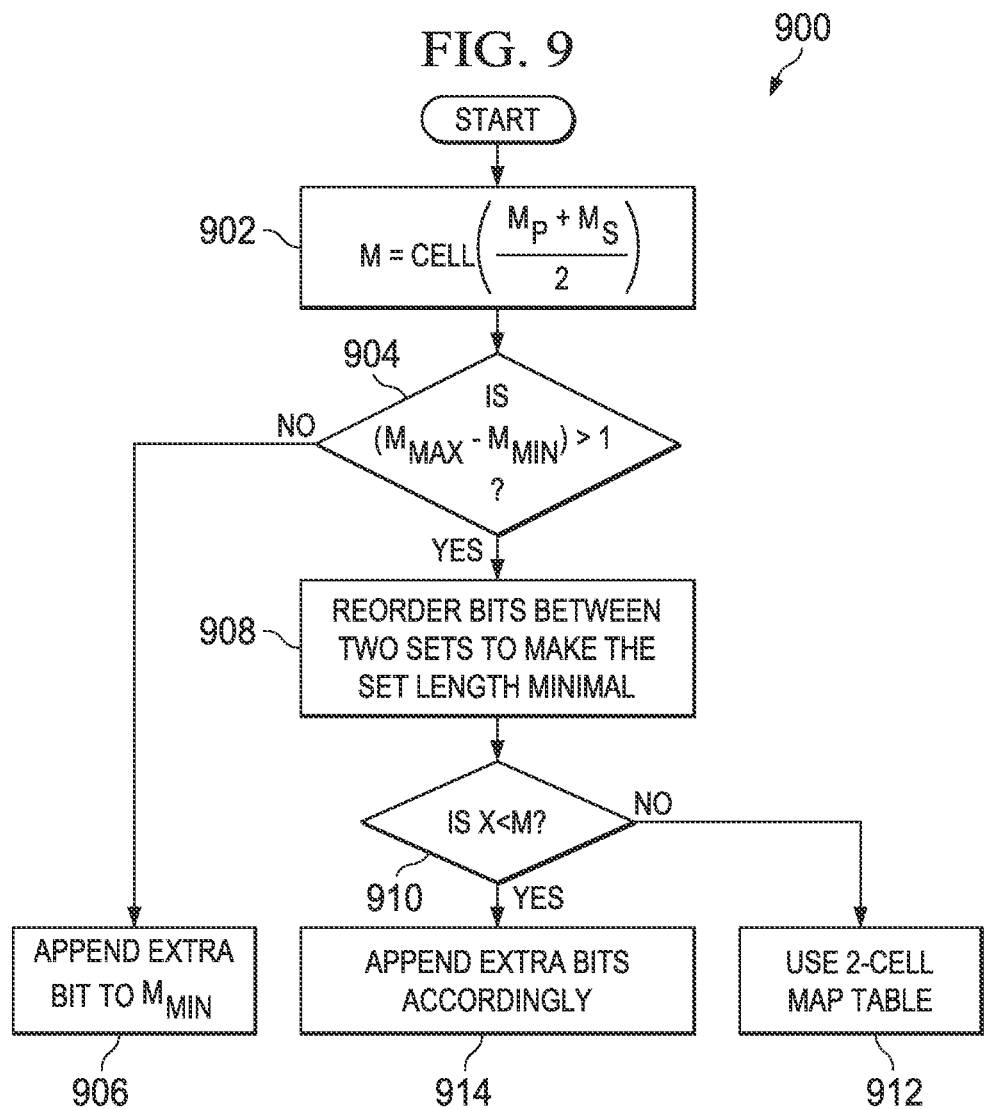

CARRIER AGGREGATION ACKNOWLEDGEMENT BITS

CLAIM OF PRIORITY

This application claims priority under 35 USC §119(e) to U.S. Patent Application Ser. No. 61/679,676, filed on Aug. 3, 2012, the entire contents of which are hereby incorporated by reference.

FIELD

The present disclosure is directed to carrier aggregation and, more particularly, to methods and systems involving acknowledgement bits used with carrier aggregation.

BACKGROUND

In wireless communications systems, such as long term evolution (LTE) systems, downlink and uplink transmissions may be organized into two duplex modes: frequency division duplex (FDD) mode and time division duplex (TDD) mode. The FDD mode uses a paired spectrum where the frequency domain is used to separate the uplink (UL) and downlink (DL) transmissions. FIG. 1A is a graphical illustration of an uplink and downlink sub-frame separated in the frequency domain for the FDD mode. In TDD systems, an unpaired spectrum may be used where both UL and DL are transmitted over the same carrier frequency. The UL and DL are separated in the time domain. FIG. 1B is a graphical illustration of UL and DL sub-frames sharing a carrier frequency in the TDD mode. In LTE-Advanced, carrier aggregation allows expansion of effective bandwidth delivered to a user terminal through concurrent utilization of radio resources across multiple carriers. Multiple component carriers are aggregated to form a larger overall transmission bandwidth. Carrier aggregation may be performed in LTE-Advanced TDD or LTE-Advanced FDD systems.

The following terms and abbreviations may be used throughout this disclosure:
ACK Acknowledgement
A/N ACK/NACK
ARI ACK/NACK Resource Indicator
BPSK Binary Phase Shift Keying
CA Carrier Aggregation
CC Component Carrier
CCE Control Channel Element
CFI Control Format Indicator
CP Cyclic Prefix
CQI Channel-Quality Indicator
CRC Cyclic Redundancy Check
DAI Downlink Assignment Index
DCI Downlink Control Information
DL DownLink
DwPTS Downlink Pilot Time Slot
eNB Evolved Node B
E-UTRA Evolved Universal Terrestrial Radio Access
FDD Frequency Division Duplex
FEC Forward Error Correction
GP Guard Period
HARQ Hybrid Automatic Repeat reQuest
IDFT Inverse Discrete Fourier Transform
IE Information Element
LTE Long Term Evolution (aka E-UTRA)
MAC Medium Access Control
MIB Master Information Block
NACK Negative Acknowledgement
OCC Orthogonal Cover Code
OFDM Orthogonal Frequency Division Multiplexing
PBCH Physical Broadcast Channel
PCFICH Physical Control Format Indicator Channel
PHICH Physical Hybrid-ARQ Indicator Channel
PCell Primary Cell
PDCCH Physical Downlink Control Channel
PDSCH Physical Downlink Shared Channel
PMI Precoding-Matrix Indicator
PRACH Physical Random Access Channel
PUCCH Physical Uplink Control Channel
QPSK Quadrature Phase Shift Keying
RACH Random Access Channel
RF Radio Frequency
RS Reference Sequence
RI Rank Indicator
RNTI Radio Network Temporary Identifier
SCell Secondary Cell
SFN System Frame Number
SIB1 System Information Block Type1
SPS Semi-persistent Scheduling
SRS Sounding Reference Signal
TDD Time Division Duplex
TTI Transmission Time Interval
UCI Uplink Control Information
UE User Equipment
UL UpLink
UpPTS Uplink Pilot Time Slot

DESCRIPTION OF THE DRAWINGS

FIG. 9 is a flowchart showing an illustrative method for adjusting ACK/NACK bits, according to one example of principles described herein.

DETAILED DESCRIPTION

Figure 1A:
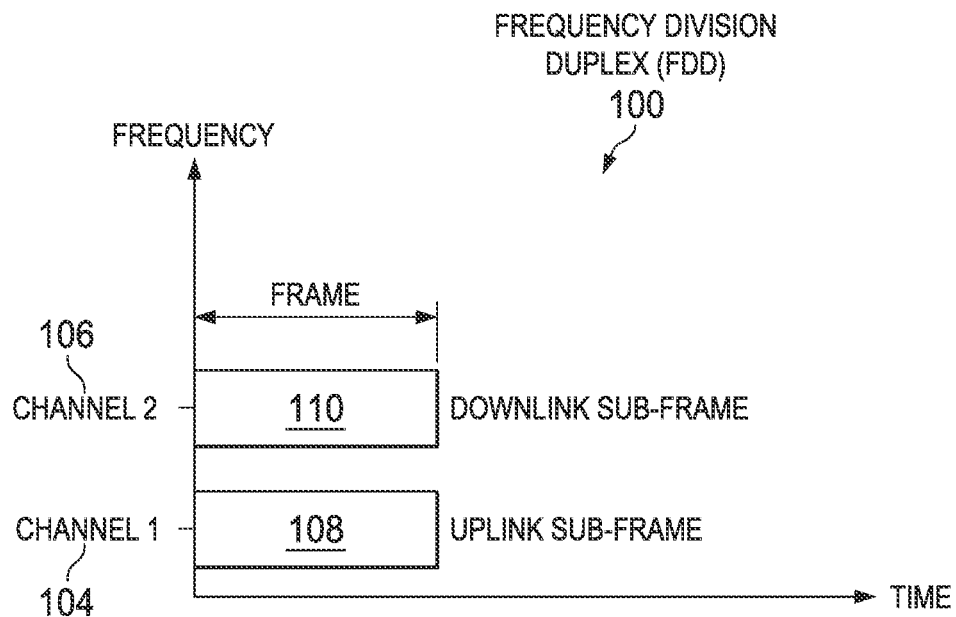
FIG. 1A is a diagram illustrating frequency division duplex, according to one example of principles described herein.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the disclosure along with their full scope of equivalents.

The present disclosure includes methods and systems for carrier aggregation between two cells of a different UL/DL configuration. According to certain illustrative examples, for each sub-frame that differs between the two cells, the HARQ-ACK scheme can be adjusted so that the same number of ACK/NACK bits is sent to both cells. This may be done so that standard mapping tables in existing specifications may be used. The following provides a more detailed explanation.

Certain aspects of the implementations include systems, methods, and user equipment (UE) for transmitting Acknowledgement/Negative Acknowledgement (ACK/NACK) bits for carrier aggregation between a first cell and a second cell in a User Equipment (UE). In certain aspects, the method may include, with the UE, for a sub-frame, comparing a first number of ACK/NACK bits for the first cell with a second number of ACK/NACK bits for the second cell. If a first number of ACK/NACK bits for the first cell is less than a second number of ACK/NACK bits for the second cell, an ACK/NACK bit position from the first cell can be used to transmit an ACK/NACK bit for the second cell.

Certain aspects of the implementations include determining that sub-frames that correspond to ACK/NACK bits for a first cell are of a different configuration than sub-frames that correspond to ACK/NACK bits for a second cell.

In certain implementations, the ACK/NACK bit positions for a cell are described in a table, the table associating combinations of ACK/NACK bits to ACK/NACK signals transmitted by the UE. If the number of ACK/NACK bits for the first cell is the same as the number of ACK/NACK bits for the second cell, all ACK/NACK bit positions from the first cell can be used to transmit only ACK/NACK bits for the first cell.

Certain aspects also include, for the sub-frame, determining that the first number of ACK/NACK bits for the first cell is zero. One or more resources (e.g., ACK/NACK resources) can be used to indicate with an ACK/NACK Resource Indicator (ARI) the number of resources being equal to the second number of ACK/NACK bits for the second cell.

In certain aspects of the implementations, the ACK/NACK bit for the second cell transmitted in the bit position for the first cell comprises one of: a DTX bit or an ACK bit.

Certain aspects of the implementations may also include reordering the ACK/NACK bit positions of at least one of: the bit positions for the first cell or the bit positions of the second cell.

In certain implementations, the reordering comprises transmitting a last ACK/NACK bit for the second cell using the position of one of: a last ACK/NACK bit or a next to last ACK/NACK bit for the first cell, wherein the last ACK/NACK bit corresponds to a sub-frame that is transmitted last to the UE, and the next to last ACK/NACK bit corresponds to a sub-frame that is transmitted immediately prior to a sub-frame that is transmitted last to the UE.

In certain aspects of the implementations, the first cell is a primary cell and the second cell is a secondary cell.

In some aspects of the implementations, the second cell is a primary cell and the first cell is a secondary cell.

Aspects of the implementations are directed to systems, methods, and UE for transmitting Acknowledgement/Negative Acknowledgement (ACK/NACK) bits for carrier aggregation between a first cell and a second cell in a User Equipment (UE). In the UE, for a sub-frame, it may be determined that a first number of ACK/NACK bits for the first cell is different than a second number of ACK/NACK bits for the second cell. It may also be determined that the sum of the first number and the second number is less than a predetermined number. The ACK/NACK bits of the first cell can be concatenated with the ACK/NACK bits of the second cell. A set of ACK/NACK bit positions corresponding to the predetermined number can be used to transmit the concatenated bits.

Certain aspects of the implementations may include, in the UE, determining that sub-frames that correspond to ACK/NACK bits for the first cell are of a different configuration than sub-frames that correspond to ACK/NACK bits for the second cell.

In certain aspects of the implementations, the first cell may be a primary cell and the second cell may be a secondary cell.

In certain implementations, the second cell may be a primary cell and the first cell may be a secondary cell.

Certain aspects of the implementations are directed to systems, methods, and UE for transmitting Acknowledgement/Negative Acknowledgement (ACK/NACK) bits for carrier aggregation between a first cell and a second cell in a User Equipment (UE). In the UE, for a sub-frame, it may be determined that a first number of ACK/NACK bits for the first cell is different than a second number of ACK/NACK bits for the second cell. An extra number of ACK/NACK bit positions may be added to a smaller of the first number and the second number of ACK/NACK bits.

Certain aspects of the implementations also may include, in the UE, determining that sub-frames that correspond to ACK/NACK bits for a first cell are of a different configuration than sub-frames that correspond to ACK/NACK bits for a second cell.

In certain implementations, the ACK/NACK bit positions for a cell are described in a table, the table associating combinations of ACK/NACK bits to ACK/NACK signals transmitted by the UE.

Certain aspects of the implementations may also include, for the sub-frame, determining that the first number of ACK/NACK bits for the first cell is zero. One or more resources (e.g., ACK/NACK resources) may indicate with an ACK/NACK Resource Indicator (ARI), the number of resources being equal to the second number of ACK/NACK bits for the second cell.

In certain aspects of the implementations, at least one bit transmitted in the extra bit positions comprises at least one bit corresponding to the cell with a larger of the first number and the second number of ACK/NACK bits.

In certain aspects of the implementations, the first cell may be a primary cell and the second cell may be a secondary cell.

In certain aspects of the implementations, the second cell may be a primary cell and the first cell may be a secondary cell.

Figure 1B:
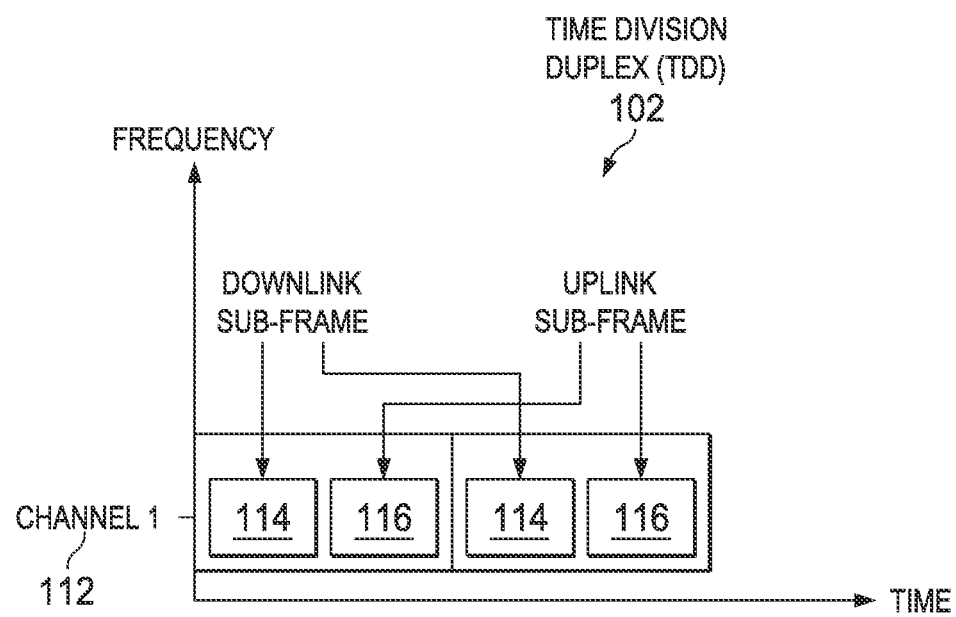
FIG. 1B is a diagram illustrating time division duplex, according to one example of principles described herein.

FIGS. 1A and 1B are diagrams showing the difference between FDD and TDD systems. The charts shown in FIGS. 1A and 1B represent frequency with the y axis and time with the x axis. The FDD chart 100 of FIG. 1A illustrates the downlink sub-frame 110 on channel 2 106 and the uplink sub-frame 108 on channel 1 104. Alternatively, the TDD chart 102 of FIG. 1B illustrates both the downlink sub-frames 114 and the uplink sub-frames 116 on the same channel 112.

In the 3GPP LTE TDD system, a sub-frame of a radio frame can be a downlink, an uplink or a special sub-frame. The special sub-frame comprises downlink and uplink time regions separated by a guard period for downlink to uplink switching. The 3GPP specification standards define seven different UL/DL configuration schemes for LTE TDD operations. These schemes are listed in Table 1. D represents downlink sub-frames, U represents uplink sub-frames and S represents the special sub-frame. The special sub-frame includes three parts, (1) the downlink pilot time slot (DwPTS), (2) the uplink pilot time slot (UpPTS) and (3) the guard period (GP). Downlink transmissions on the PDSCH may be made in DL sub-frames or in the DwPTS portion of a special sub-frame.

The table below illustrates LTE TDD uplink-downlink configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As Table 1 shows, there are two switching point periodicities specified in the LTE standard; 5 ms and 10 ms. The 5 ms switching point periodicity is introduced to support the co-existence between LTE and low chip rate UTRA TDD systems and 10 ms switching point periodicity is for the coexistence between LTE and high chip rate UTRA TDD systems. The supported configurations cover a wide range of UL/DL allocations from a DL heavy 1:9 ratio to a UL heavy 3:2 ratio. The DL allocations in these ratios include both DL sub-frames and special sub-frames, which can also carry downlink transmissions in DwPTS. Therefore, compared to FDD systems, TDD systems have more flexibility in terms of the proportion of resources assignable to uplink and downlink communications within a given assignment of spectrum. Specifically, it is possible to distribute the radio resources unevenly between uplink and downlink. This will provide a way to utilize the radio resources more efficiently by selecting an appropriate UL/DL configuration based on interference situation and different traffic characteristics in DL and UL.

Because the UL and DL transmissions are not continuous (i.e. UL or DL transmissions do not necessarily occur in every sub-frame) in an LTE TDD system, the scheduling and HARQ timing relationships are separately defined in the specifications. Currently, the HARQ ACK/NACK timing relationship for the downlink is shown below in Table 2. It associates an UL sub-frame n, which conveys ACK/NACK, with DL sub-frames n−ki, i=0 to M−1. The set of DL sub-frames for which ACK/NACK is provided is referred to herein as the bundling window, and the number of sub-frames for which ACK/NACK is provided, M, is referred to as the bundling window size.

TABLE 2

| | Downlink association set index K: $\{k_0, k_1, \ldots k_{M-1}\}$ | | | | | | | | | |
|---|---|---|---|---|---|---|---|---|---|---|
| UL-DL | Sub-frame n | | | | | | | | | |
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The uplink HARQ ACK/NACK timing linkage is shown in table 3 below. The table indicates that the PHICH ACK/NACK received in the DL sub-frame i is linked with the UL data transmission in the UL sub-frame i−k, k being given in Table 2. In addition, for UL/DL configuration 0, in sub-frames 0 and 5, IPHICH=1 and k=6. This is because there may be two ACK/NACKs for a UE transmitted on the PHICH in sub-frames 0 and 5, one is represented by IPHICH=1, the other is IPHICH=0. IPHICH just serves as an index.

TABLE 3

| | k for HARQ ACK/NACK | | | | | | | | | |
|---|---|---|---|---|---|---|---|---|---|---|
| TDD UL/DL | sub-frame number i | | | | | | | | | |
| Configuration | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

The UL grant, ACK/NACK and transmission/retransmission relationship is shown below in Table 4. The UE shall upon detection of a PDCCH with DCI format 0 and/or a PHICH transmission in sub-frame n intended for the UE, adjust the corresponding PUSCH transmission in sub-frame n+k, with k given in Table 4

For TDD UL/DL configuration 0, if the least significant bit (LSB) of the UL index in the DCI format 0 is set to 1 in sub-frame n or a PHICH is received in sub-frame n=0 or 5 in the resource corresponding to IPHICH=1, or PHICH is received in sub-frame n=1 or 6, the UE shall adjust the corresponding PUSCH transmission in sub-frame n+7. If, for TDD UL/DL configuration 0, both the most significant bit (MSB) and LSB of the UL index in the DCI format 0 are set in sub-frame n, the UE shall adjust the corresponding PUSCH transmission in both sub-frames n+k and n+7, with k given in Table 4

TABLE 4 k for PUSCH transmission

| TDD UL/DL Configuration | sub-frame number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | | 4 | | | 6 | 4 |
| 2 | | | 4 | | | | | 4 | | |
| 3 | 4 | | | | | | | 4 | 4 | |
| 4 | | | | | | | | | 4 | 4 |
| 5 | | | | | | | | | 4 | |
| 6 | 7 | 7 | | | | 7 | 7 | | | 5 |

As can be seen, both grant and HARQ timing linkage in TDD are much more complicated than the fixed time linkages used in an LTE FDD system. It usually requires more attention in design.

Figure 2:
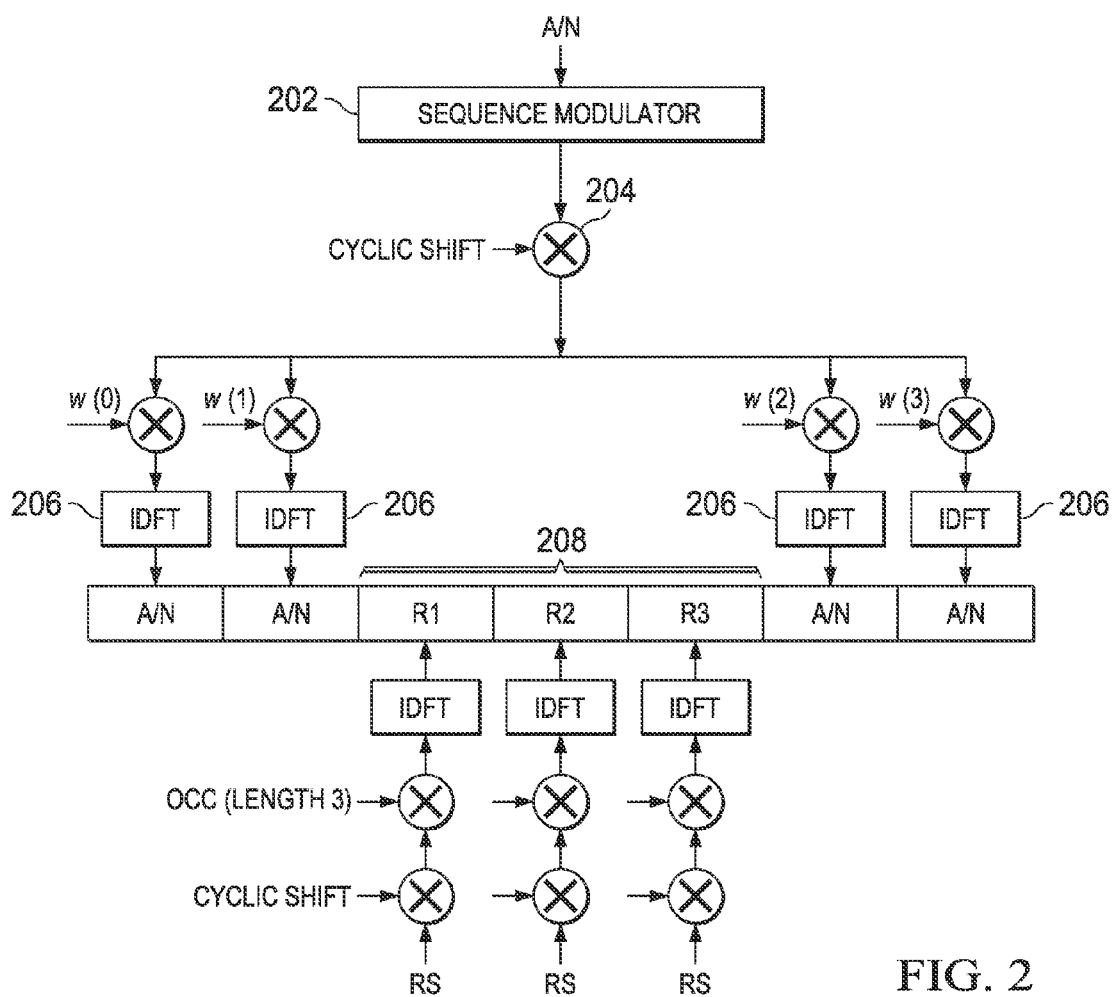
FIG. 2 is a diagram showing PUCCH format 1a/1b slot structure, according to one example of principles described herein.

The physical uplink control channel (PUCCH) format 1a/1b is used to transmit the ACK/NACK signaling when ACK/NACK is not multiplexed into a PUSCH transmission. The slot structure of PUCCH formats 1a and 1b with normal cyclic prefix is shown in FIG. 2. Each format 1a/1b PUCCH is in a sub-frame made up of two slots. The same modulation symbol is used in both slots. Formats 1a and 1b carry one and two ACK/NACK bits, respectively. These bits are encoded into the modulation symbol using either BPSK or QPSK modulation using a sequence modulator 202, the modulation being based on the number of ACK/NACK bits. The symbol is multiplied by a cyclic-shifted sequence 204 with length-12. Then, the samples are mapped to the 12 subcarriers that the PUCCH is to occupy and then converted to the time domain via an IDFT 206. The spread signal is then multiplied with an orthogonal cover sequence with length of 4, w(m), where m ∈ {0,1,2,3} corresponds to each one of 4 data bearing symbols in the slot. There are three reference symbols 208 in each slot (located in the middle symbols of the slot) that allow channel estimation for coherent demodulation of formats 1a/1b.

When downlink carrier aggregation is used or when TDD has more downlink sub-frames than uplink sub-frames, more than the two ACK/NACK bits that can be supported on PUCCH format 1b may be required. When 3 or 4 ACK/NACK bits are needed, PUCCH format 1b may be used with channel selection.

A UE encodes information using channel selection by selecting a PUCCH resource on which to transmit. Channel selection may use 4 PUCCH resources to convey two extra bits. This can be described using a 4 bit ACK/NACK configuration for TDD, shown below in Table 5:

TABLE 5

Transmission of HARQ-ACK multiplexing for M = 4

| HARQ-ACK(0) | $n_{PUCCH}^{(1)}$ | b(0), b(1) |
|---|---|---|
| ACK | $n_{PUCCH,1}^{(1)}$ | 1, 1 |
| ACK | $n_{PUCCH,1}^{(1)}$ | 1, 0 |
| NACK/DTX | $n_{PUCCH,2}^{(1)}$ | 1, 1 |
| ACK | $n_{PUCCH,1}^{(1)}$ | 1, 0 |
| NACK | $n_{PUCCH,0}^{(1)}$ | 1, 0 |
| ACK | $n_{PUCCH,1}^{(1)}$ | 1, 0 |
| ACK | $n_{PUCCH,3}^{(1)}$ | 0, 1 |
| NACK/DTX | $n_{PUCCH,3}^{(1)}$ | 1, 1 |
| ACK | $n_{PUCCH,2}^{(1)}$ | 0, 1 |
| ACK | $n_{PUCCH,0}^{(1)}$ | 0, 1 |
| ACK | $n_{PUCCH,0}^{(1)}$ | 1, 1 |
| NACK/DTX | $n_{PUCCH,3}^{(1)}$ | 0, 1 |
| NACK/DTX | $n_{PUCCH,1}^{(1)}$ | 0, 0 |
| NACK/DTX | $n_{PUCCH,2}^{(1)}$ | 1, 0 |

TABLE 5-continued

Transmission of HARQ-ACK multiplexing for M = 4

| HARQ-ACK(0) | $n_{PUCCH}^{(1)}$ | b(0), b(1) |
|---|---|---|
| NACK/DTX | $n_{PUCCH,3}^{(1)}$ | 1, 0 |
| NACK/DTX | $n_{PUCCH,1}^{(1)}$ | 0, 1 |
| NACK/DTX | $n_{PUCCH,3}^{(1)}$ | 0, 1 |
| NACK/DTX | $n_{PUCCH,2}^{(1)}$ | 0, 0 |
| NACK/DTX | $n_{PUCCH,3}^{(1)}$ | 0, 0 |
| DTX | | No transmission |

TABLE 6

QPSK modulation mapping used with channel selection

| b(0), b(1) | QPSK symbol value |
|---|---|
| 0, 0 | 1 |
| 0, 1 | −j |
| 1, 0 | j |
| 1, 1 | −1 |

Each row of the table indicates a combination of ACK/NACK bits to be transmitted. The column headed by $n^{(1)}_{PUCCH}$ indicates a PUCCH resource to transmit on (using format 1b), while the column headed by b(0), b(1) indicates the value of the QPSK modulation symbol to transmit on the PUCCH resource. For LTE Rel-10, values of b(0), b(1) map to QPSK modulation symbols as shown in Table 6 above. The UE transmits on ('selects') one of four PUCCH resources $n^{(1)}_{PUCCH,i}$, which conveys two bits of information in addition to the two bits carried by the QPSK modulation. The PUCCH resource which a UE is to use may be signaled via either implicit or explicit signaling.

In LTE TDD operation, the number of ACK/NACK bits to be transmitted may be reduced by spatial bundling. In spatial bundling, two HARQ-ACK bits for two transport blocks transmitted on one PDSCH are logical AND'd together, resulting in one spatially bundled HARQ-ACK bit. In Rel-10 TDD, spatial bundling is applied in subframes where the bundling window size is larger than 1, and so in this case the number of HARQ-ACK bits is equal to the bundling window size. Also, because only one HARQ-ACK bit is needed when MIMO is not configured for a UE, the number of HARQ-ACK bits is equal to the bundling window size when MIMO is not configured.

Figure 3:
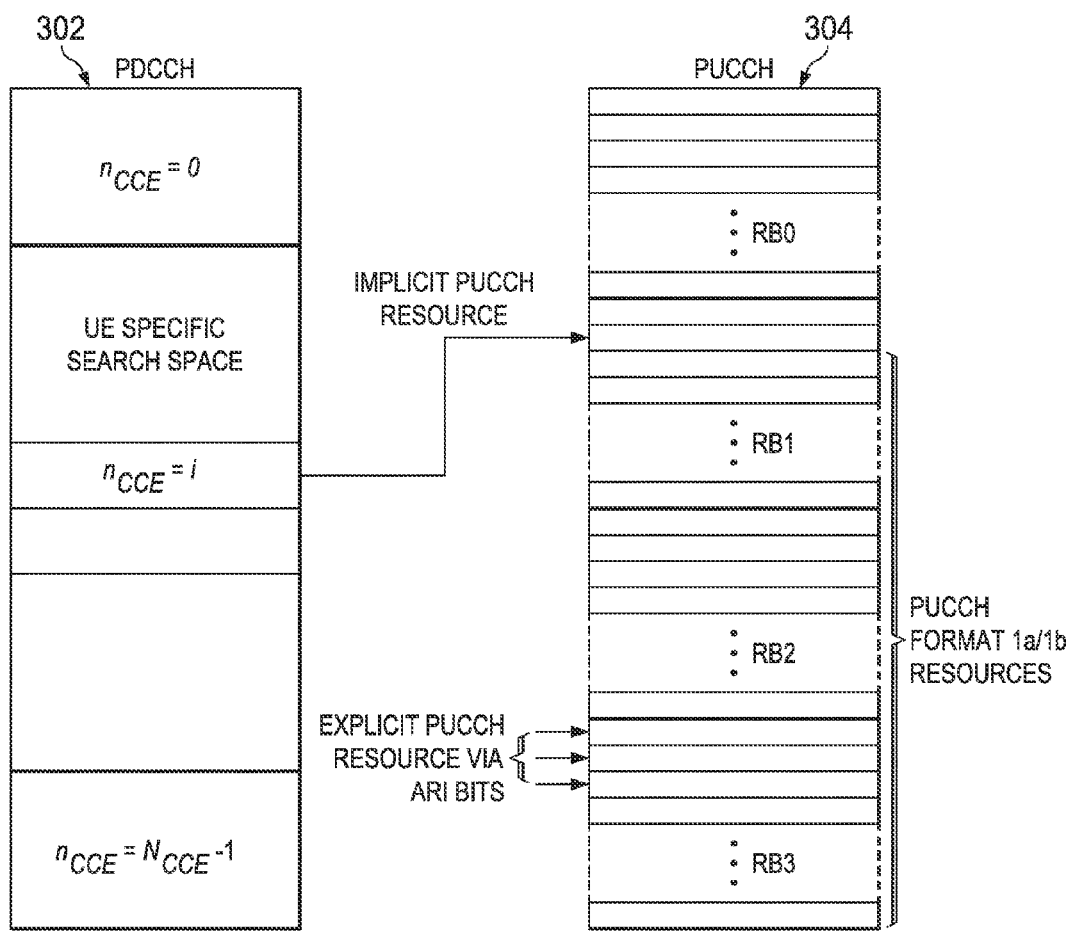
FIG. 3 is a diagram showing PUCCH resource mapping, according to one example of principles described herein.

In the case of implicit signaling for TDD, for a PDSCH transmission indicated by the detection of corresponding PDCCH or a PDCCH indicating downlink SPS release in sub-frame $n-k_i$ where $k_i$ is an element of K, $k_i \in K$, defined in Table 1, the PUCCH resource $n_{PUCCH,i}^{(1)}=(M-i-1)\cdot N_c + i\cdot N_{c+1}+n_{CCE,i}+N_{PUCCH}^{(1)}$, where c is selected from {0, 1, 2, 3} such that $N_c \leq n_{CCE,i} < N_{c+1}$, where M is the number of elements in the set K defined in Table 1. $N_c = \max\{0, \lfloor [N_{RB}^{DL} \cdot (N_{sc}^{RB} \cdot c - 4)]/36 \rfloor\}$, $n_{CCE,i}$ is the number of the first CCE used for transmission of the corresponding PDCCH in sub-frame $n-k_i$, and $N_{PUCCH}^{(1)}$ is configured by higher layers. In the case of explicit signaling, the PUCCH resource is indicated via the ACK/NACK resource indicator (ARI) bits and higher layer configuration. FIG. 3 illustrates the PUCCH resource mapping scheme.

In carrier aggregation (CA), PUCCH resources 304 are signaled implicitly using the location of the scheduling grant for the UE on the PDCCH of its primary cell (PCell), and PUCCH resources 304 may be indicated using the ARI bits contained in the grant for the UE on the PDCCH 302 of one of the UE's secondary cells (SCells). This means that, if the secondary cell ("SCell") is cross carrier scheduled by PDCCH 302 transmitted on the primary cell ("PCell"), then the PUCCH resource 304 is implicitly signaled by the first CCE index. If the SCell schedules a PDSCH using its own PDCCH 302, the PUCCH resource index is determined by the ARI bits.

As in LTE FDD, the current Rel-10 LTE specification defines carrier aggregation (CA) for TDD systems. However, it only supports CA for cells having the same UL/DL configuration on the aggregated carriers. Methods described herein enable support for CA with cells that have different TDD UL/DL configurations.

PDSCH HARQ timing of SCell may follow the reference configuration timing summarized in Table 7 at least for full duplex self-scheduling case.

TABLE 7

Reference configuration for SCell PDSCH HARQ timing.

| Pcell SIB1 Configuration | Scell SIB1 Configuration | | | | | | |
|---|---|---|---|---|---|---|---|
| | 0 | 1 | 2 | 3 | 4 | 5 | 6 |
| 0 | 0 | 1 | 2 | 3 | 4 | 5 | 6 |
| 1 | 1 | 1 | 2 | 4 | 4 | 5 | 1 |
| 2 | 2 | 2 | 2 | 5 | 5 | 5 | 2 |
| 3 | 3 | 4 | 5 | 3 | 4 | 5 | 3 |
| 4 | 4 | 4 | 5 | 4 | 4 | 5 | 4 |
| 5 | 5 | 5 | 5 | 5 | 5 | 5 | 5 |
| 6 | 6 | 1 | 2 | 3 | 4 | 5 | 6 |

It is noted that a component carrier ('CC') is also known as a serving cell or a cell. Furthermore, when multiple CCs are scheduled, for each UE, one of the CCs is designated as the primary carrier which is used for PUCCH transmission, semi-persistent scheduling, etc, while the remaining CCs are configured as secondary CCs. This primary carrier is also known as PCell (Primary cell), while the secondary CC is known as SCell (Secondary cell).

Because UEs receiving a PDSCH on a PCell use the PCell as the HARQ timing reference for the PDSCH, there are cases where the timing reference for the PDSCH on the SCell based on Table 7 may be different from that of the PCell. As a result, the downlink association sets of PCell and SCell may be different for a given UL sub-frame in Table 2. The current specification (Rel-10) only specifies the method of transmitting PDSCH ACK/NACK bits using PUCCH format 1a/1b with channel selection in the scenario with the same downlink association set (therefore having the same bundling window size). This method needs to be changed to deal with the different bundling window sizes in inter-band CA with different UL/DL configurations.

In methods described herein, PUCCH may be transmitted only on PCell in the case of inter-band CA with different UL/DL configurations. Therefore, PDSCH HARQ ACK/NACK bits for both PCell and SCell have to be conveyed on PCell if PUCCH is used. For the same bundling window size on PCell and SCell, the scheme to use PUCCH format 1b with channel selection for ACK/NACK transmission has been defined in Release 10 specification 3GPP TS 36.213. References to tables 10.1.3.2-1, 10.1.3.2-2, 10.1.3.2-3, 10.1.3.2-5, or 10.1.3.2-6 are references to tables found in 3gPP TS 36.213.

Figure 4:
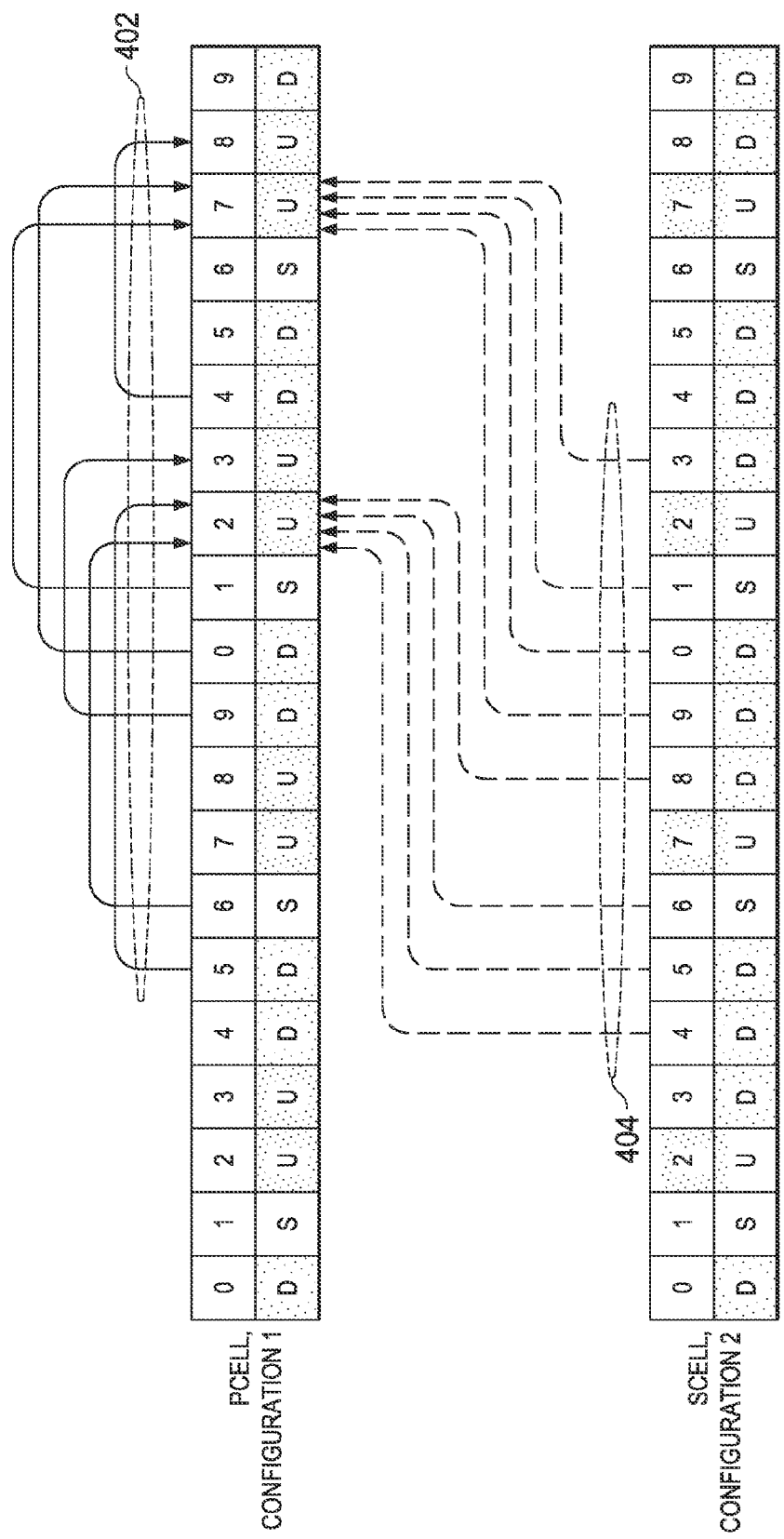
FIG. 4 is a diagram showing PDSCH HARQ timing linkage in carrier aggregation, according to one example of principles described herein.

In inter-band CA with different UL/DL configurations, the bundling window size of different cells may be different. For example, as shown in FIG. 4, the PCell with UL/DL configuration 1 is aggregated with the SCell of UL/DL configuration 2. Based on the PDSCH HARQ timing agreement, the PCell follows its own UL/DL configuration 1 PDSCH HARQ timing. The SCell follows UL/DL configuration 2 timing reference, as indicated in Table 7. The solid line 402 represents the PDSCH HARQ timing linkage of the PCell. The dotted line 404 represents the PDSCH HARQ timing of SCell. Herein we refer to the bundling window size for PCell using Mp, and the bundling window for SCell using Ms. On PCell sub-frame #2 or #7, the bundling window size for the PCell is two (Mp=2), and for the SCell it is four (Ms=4). At sub-frame #3 or #8, Mp=1, Ms=0. In this case the bundling window size matches the number of elements in the downlink association set in Table 2. However, the bundling window sizes are different for the PCell and the SCell.

Figure 5:
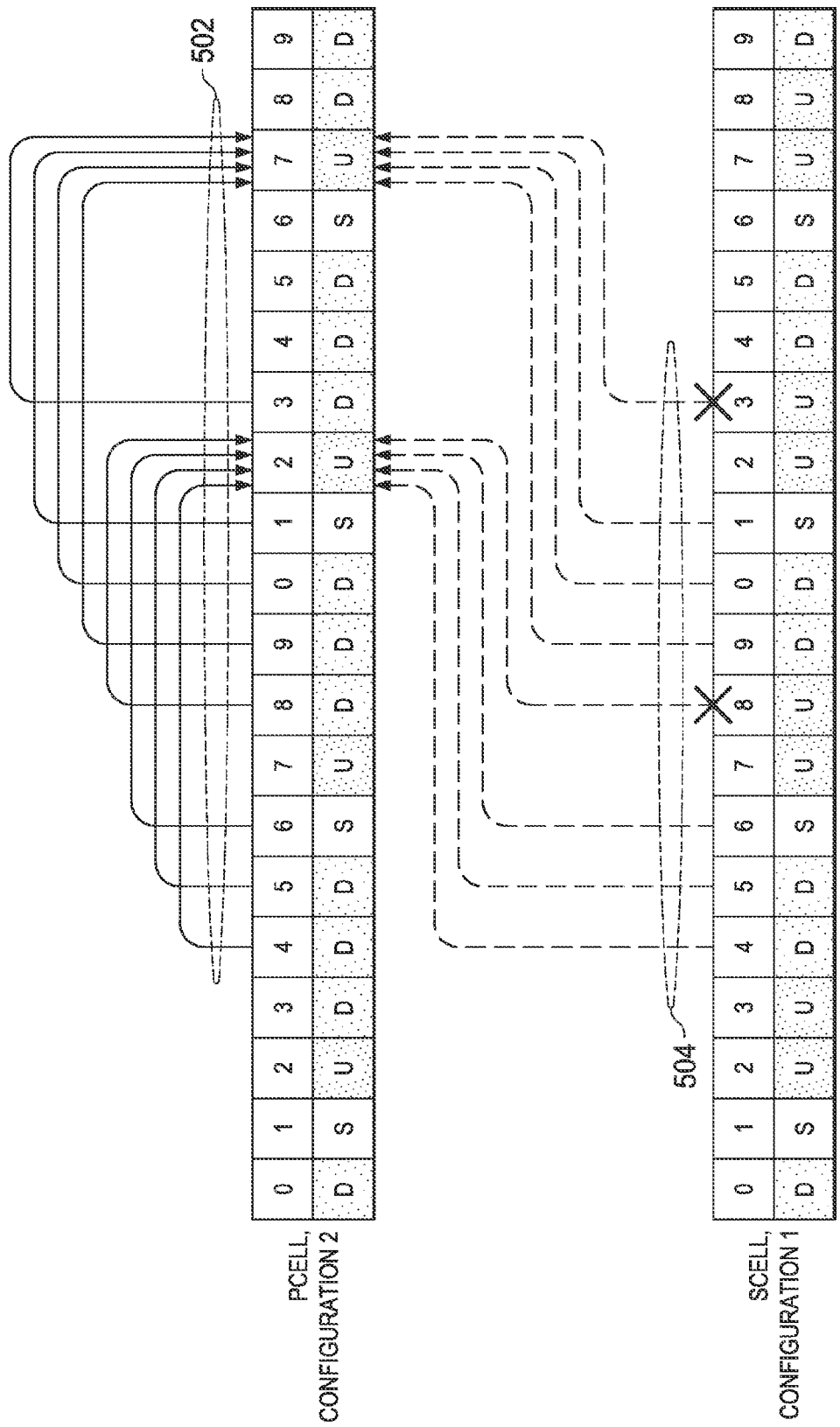
FIG. 5 is a diagram showing PDSCH HARQ timing linkage in carrier aggregation, according to one example of principles described herein.

Another example where the PCell is configuration 2 and the SCell is configuration 1 is shown in FIG. 5. From Table 7, the PDSCH HARQ timing follows configuration 2 for both the PCell and the SCell. So, the downlink association set is the same for both cells if it is solely dependent on Table 2. However, as we can see from FIG. 5, because sub-frame #8 and #3 on the SCell are UL sub-frames, there will never be PDSCH on these two sub-frames. Again, the solid line 502 represents the PDSCH HARQ timing linkage of the PCell and the dotted line 504 represents the PDSCH HARQ timing of SCell. The bundling window size for the PCell is four (Mp=4), and for the SCell is three (Ms=3). They are different as well even though the downlink association set is same based on the reference UL/DL configuration. Therefore, new schemes have to be proposed to deal with the different bundling window sizes in inter-band CA with different UL/DL configurations.

Through methods described herein, the existing ACK/NACK codebook for a one serving cell mapping table and a two cell mapping table (see appendices for example tables) can be directly used without any modification. At a sub-frame where all ACK/NACKs are for one cell, a one serving cell mapping table is used to avoid using unnecessary DTX bits. If the number of ACK/NACK bits for the first cell and second cell are different, but non-zero, then the ACK/NACK bits can be reordered or adjusted to minimize the number of ACK/NACK bits required. This can be done without the need for modified codebooks.

Table lists possible combinations of bundling window size for PCell and SCell, (Mp, Ms). Note that this is only intended for PUCCH format 1b with channel selection. Any CA case involving UL/DL configuration 5 or referring it as reference timing may use PUCCH format 3 due to the large number of ACK/NACK bits. The CA with the same UL/DL configuration on both PCell and SCell is not listed in the table either because it has already been covered in the current specification.

TABLE 8

Possible combination of (Mp, Ms) with different CA scenarios

| PCell SIB1 Config | PCell PUCCH SF # | SCell SIB1 Config | | | | | | |
|---|---|---|---|---|---|---|---|---|
| | | 0 | 1 | 2 | 3 | 4 | 5 | 6 |
| 0 | 2 | | | (1, 2) | (1, 4) | (1, 3) | (1, 4) | (1, 1) |
| | 3 | | | (0, 1) | (0, 0) | (0, 2) | (0, 4) | (0, 1) |
| | 4 | | | (1, 0) | (1, 0) | (1, 2) | (1, 0) | (1, 1) |
| | 7 | | | (1, 2) | (1, 4) | (1, 0) | (1, 0) | (1, 1) |
| | 8 | | | (0, 1) | | | | (0, 1) |
| | 9 | | | (1, 0) | (1, 0) | (1, 0) | (1, 0) | (1, 0) |
| 1 | 2 | (2, 2) | | | (2, 4) | (2, 3) | (2, 4) | (2, 2) |
| | 3 | (1, 0) | | | (1, 0) | (1, 4) | (1, 4) | (1, 1) |
| | 4 | | | | | | | |

TABLE 8-continued

Possible combination of (Mp, Ms) with different CA scenarios

| PCell SIB1 Config | PCell PUCCH SF # | SCell SIB1 Config 0 | 1 | 2 | 3 | 4 | 5 | 6 |
|---|---|---|---|---|---|---|---|---|
|  | 7 | (2, 2) |  | (2, 4) | (2, 0) | (2, 0) |  | (2, 2) |
|  | 8 | (1, 0) |  | (1, 0) | (1, 0) | (1, 0) |  | (1, 0) |
|  | 9 |  |  |  |  |  |  |  |
| 2 | 2 | (4, 2) | (4, 3) |  |  |  |  | (4, 2) |
|  | 3 |  |  |  |  |  |  |  |
|  | 4 |  |  |  |  |  |  |  |
|  | 7 | (4, 2) | (4, 3) |  |  |  |  | (4, 3) |
|  | 8 |  |  |  |  |  |  |  |
|  | 9 |  |  |  |  |  |  |  |
| 3 | 2 | (3, 3) | (3, 4) |  |  | (3, 4) |  | (3, 3) |
|  | 3 | (2, 0) | (2, 2) |  |  | (2, 4) |  | (2, 0) |
|  | 4 | (2, 1) | (2, 0) |  |  | (2, 0) |  | (2, 2) |
|  | 7 |  |  |  |  |  |  |  |
|  | 8 |  |  |  |  |  |  |  |
|  | 9 |  |  |  |  |  |  |  |
| 4 | 2 | (4, 3) | (4, 4) |  | (4, 3) |  |  | (4, 3) |
|  | 3 | (4, 1) | (4, 2) |  | (4, 4) |  |  | (4, 2) |
|  | 4 |  |  |  |  |  |  |  |
|  | 7 |  |  |  |  |  |  |  |
|  | 8 |  |  |  |  |  |  |  |
|  | 9 |  |  |  |  |  |  |  |
| 5 | 2 |  |  |  |  |  |  |  |
|  | 3 |  |  |  |  |  |  |  |
|  | 4 |  |  |  |  |  |  |  |
|  | 7 |  |  |  |  |  |  |  |
|  | 8 |  |  |  |  |  |  |  |
|  | 9 |  |  |  |  |  |  |  |
| 6 | 2 | (1, 1) | (1, 2) | (1, 4) | (1, 3) | (1, 4) |  |  |
|  | 3 | (1, 1) | (1, 1) | (1, 0) | (1, 2) | (1, 4) |  |  |
|  | 4 | (1, 0) | (1, 0) | (1, 0) | (1, 2) | (1, 0) |  |  |
|  | 7 | (1, 1) | (1, 2) | (1, 4) | (1, 0) | (1, 0) |  |  |
|  | 8 | (1, 1) | (1, 1) | (1, 0) | (1, 0) | (1, 0) |  |  |
|  | 9 |  |  |  |  |  |  |  |

With the methods described herein, the existing ACK/NACK codebook for one serving cell Table 10.1.3-5/6/7 and two cells Table 10.1.3.2-1/2/3/5/6 defined in 3GPP TS 36.213 can be directly used without any modification.

An example of a mapping table is shown below:

TABLE 9

Transmission of Format 1b HARQ-ACK channel selection for A = 4

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | No Transmission | |

An example of a two cell mapping is shown below:

TABLE 10

Transmission of HARQ-ACK multiplexing for M = 3

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |

TABLE 10-continued

Transmission of HARQ-ACK multiplexing for M = 3

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

Figure 6:
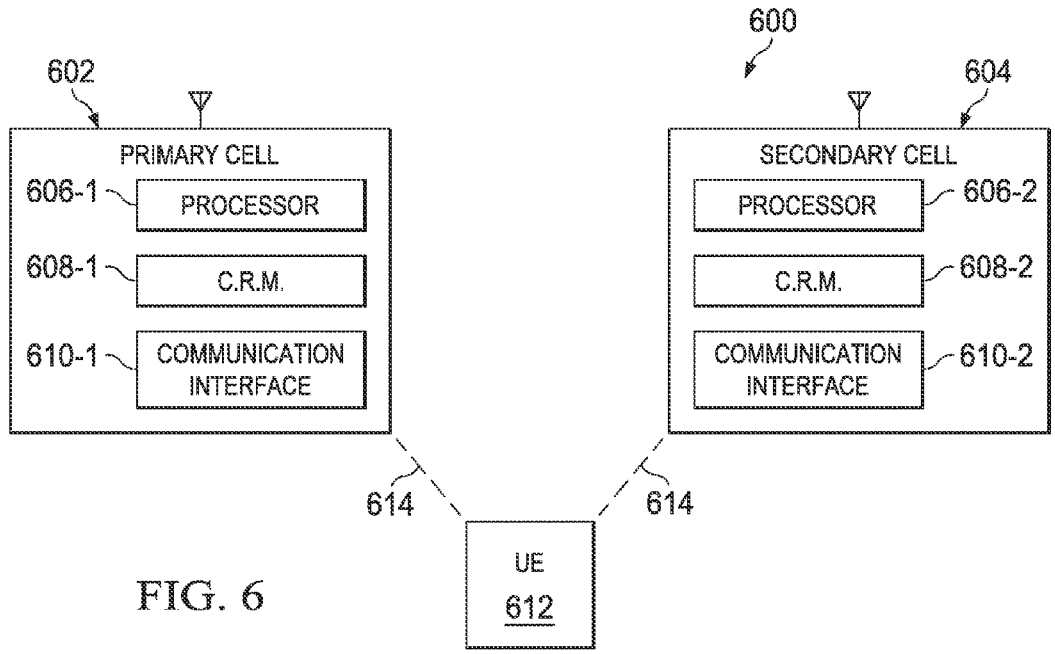
FIG. 6 is a diagram showing carrier aggregation, according to one example of principles described herein.

FIG. 6 is a diagram showing an illustrative communication system 600 in which carrier aggregation may be used. According to certain illustrative examples, the system 600 includes a primary cell 602, a secondary cell 604, and a UE 612. Both cells 602, 604 include a processor 606, a computer readable medium 608, and a communication interface 610. The processor 606 is used to process a set of computer readable instructions which may be stored on the computer readable medium 608. The computer readable instructions, when executed by the processor 606, cause the cell to perform a variety of tasks related to routing, switching, and other tasks for management of wireless voice and data traffic between the cells and a number of UEs 612. The UE can communicate with both cells 602 and 604 across a wireless link 614.

Figure 7:
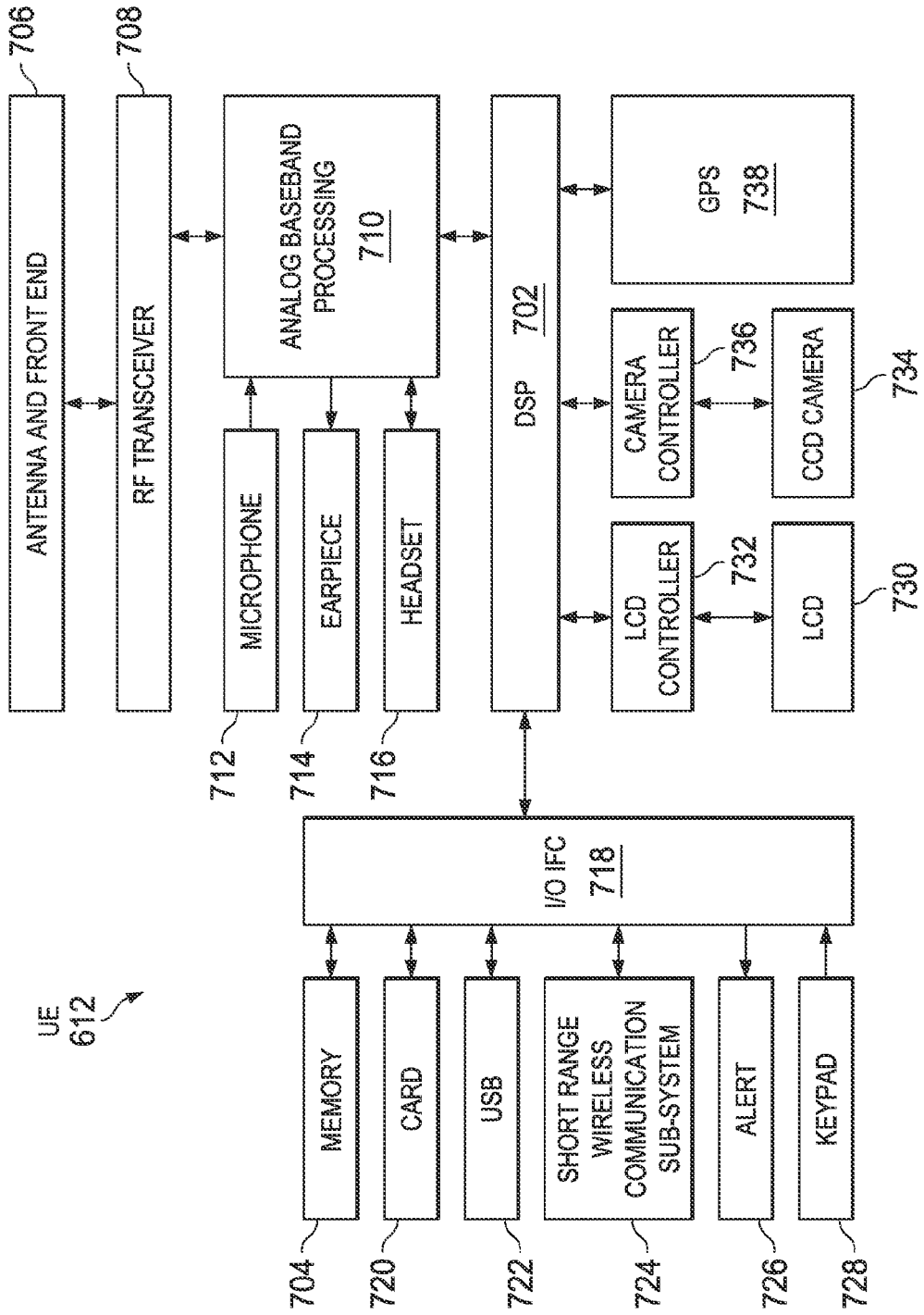
FIG. 7 is a diagram showing a UE, according to one example of principles described herein.

FIG. 7 is a schematic block diagram of the UE 612. The UE 612 includes a digital signal processor (DSP) 702 and a memory 704. As shown, the UE 612 may further include an antenna and front end unit 706, a radio frequency (RF) transceiver 708, an analog baseband processing unit 710, a microphone 712, an earpiece speaker 714, a headset port 716, an input/output interface 718, a removable memory card 720, a universal serial bus (USB) port 722, a short range wireless communication sub-system 724, an alert 726, a keypad 728, a liquid crystal display (LCD), which may include a touch sensitive surface 730, an LCD controller 732, a charge-coupled device (CCD) camera 734, a camera controller 736, and a global positioning system (GPS) sensor 738.

The DSP 702 or some other form of controller or central processing unit operates to control the various components of the UE 612 in accordance with embedded software or firmware stored in memory 704. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The antenna and front end unit 706 may be provided to convert between wireless signals and electrical signals, enabling the UE 612 to send and receive information from a cellular network or some other available wireless communications network. The RF transceiver 708 provides frequency shifting, converting received RF signals to baseband and converting baseband transmit signals to RF. The analog baseband processing unit 710 may provide channel equalization and signal demodulation to extract information from received signals, may modulate information to create transmit signals, and may provide analog filtering for audio signals. To that end, the analog baseband processing unit 710 may have ports for connecting to the built-in microphone 712 and the earpiece speaker 714 that enable the UE 612 to be used as a cell phone. The analog baseband processing unit 710 may further include a port for connecting to a headset or other hands-free microphone and speaker configuration.

The DSP 702 may send and receive digital communications with a wireless network via the analog baseband processing unit 710. In some embodiments, these digital communications may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB interface 722 and the short range wireless communication sub-system 724. The USB interface 722 may be used to charge the UE 612 and may also enable the UE 612 to function as a peripheral device to exchange information with a personal computer or other computer system. The short range wireless communication sub-system 724 may include an infrared port, a Bluetooth interface, an IEEE 802.11 compliant wireless interface, or any other short range wireless communication sub-system, which may enable the UE 612 to communicate wirelessly with other nearby mobile devices and/or wireless base stations.

The input/output interface 718 may further connect the DSP 702 to the alert 726 that, when triggered, causes the UE 612 to provide a notice to the user, for example, by ringing, playing a melody, or vibrating. The alert 726 may serve as a mechanism for alerting the user to any of various events such as an incoming call, a new text message, and an appointment reminder by silently vibrating, or by playing a specific pre-assigned melody for a particular caller.

The keypad 728 couples to the DSP 702 via the interface 718 to provide one mechanism for the user to make selections, enter information, and otherwise provide input to the UE 612. The keyboard 728 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 730, which may include touch screen capability and also display text and/or graphics to the user. The LCD controller 732 couples the DSP 702 to the LCD 730.

The CCD camera 734, if equipped, enables the UE 612 to take digital pictures. The DSP 702 communicates with the CCD camera 734 via the camera controller 736. The GPS sensor 738 is coupled to the DSP 702 to decode global positioning system signals, thereby enabling the UE 612 to determine its position. Various other peripherals may also be included to provide additional functions, e.g., radio and television reception.

Figure 8:
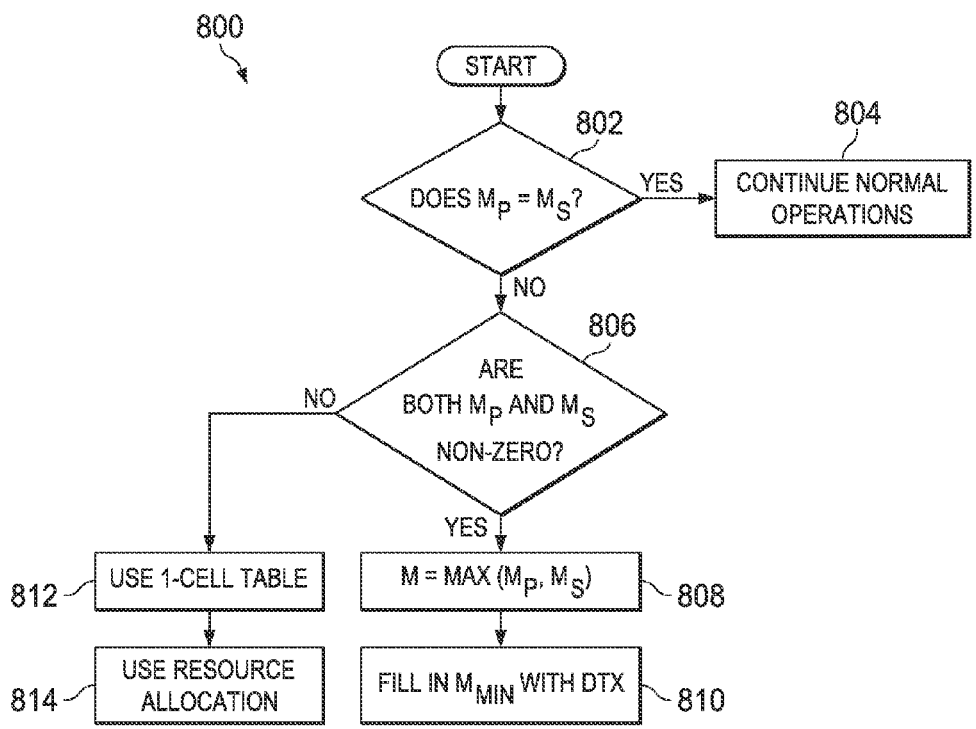
FIG. 8 is a flowchart showing an illustrative method for adjusting ACK/NACK bits, according to one example of principles described herein.

FIG. 8 is a flowchart showing an illustrative method 800 for adjusting the number and/or order of ACK/NACK bits. In this illustrative method, Mp is equal to the number of ACK/NACK bits for the primary cell, and Ms is equal to the number of ACK/NACK bits for the SCell. According to certain illustrative examples, for a particular sub-frame, it is determined 802 whether the bundling window size for a primary cell (Mp) is equal to the bundling window size for a secondary cell (Ms). If it is determined (802, YES) that Mp=Ms, then the method proceeds 804 according to normal operations. This involves using a standard mapping table for the appropriate bundling window size.

If it is determined (802, NO) that Mp does not equal Ms, then the method proceeds. It is next determined 806 whether or not both Mp and Ms are non-zero. If it is determined that either Mp or Ms is zero (806, NO), then a one serving cell mapping table is used 812. The number of ACK/NACK bit positions for the mapping table will be equal to the non-zero number of either Mp or Ms. In some examples, a resource allocation method may then be used 814. This resource allocation method will be discussed in more detail below.

If it is determined (806, YES) that both Mp and Ms are non-zero, then a two serving cell mapping table is used. The M value to be used in the table will be 808 the greater of Mp or Ms. The remaining bits from the smaller of Mp or Ms may then be filled in 810 with extra bits. These extra bits may be, e.g., DTX bits or ACK bits.

An example of this method may also be described as follows:

If Mp=Ms, the UE shall use the Rel-10 two serving cell mapping table (one of tables 10.1.3.2-1, 10.1.3.2-2, 10.1.3.2-3, 10.1.3.2-5, or 10.1.3.2-6), resource allocation, and spatial bundling procedures directly.

Else if both Mp and Ms are nonzero,

The UE shall use the Rel-10 two serving cell mapping (one of tables 10.1.3.2-1, 10.1.3.2-2, 10.1.3.2-3, 10.1.3.2-5, or 10.1.3.2-6) with M=max{Mp, Ms} or A=max{Mp, Ms}, where Mp is the number of elements in set Kc for the primary cell and Ms is the number of elements in set Kc for the secondary cell.

The UE shall set DTX for {HARQ-ACK(min{Mp, Ms}), ..., HARQ-ACK(M−1)} for the serving cell with the smaller Mc value.

Else,

The UE shall use the Rel-10 mapping table for one serving cell with M=max {Mp, Ms} along with the resource allocation described below.

Alternatively, UE may set ACK instead of DTX for {HARQ-ACK(min{Mp,Ms}), ..., HARQ-ACK(M−1)} bits if there is a performance advantage to do so. Other alternatives, such as using (M, min{Mp, Ms}) block code, are also possible.

It is noted that using the Rel-10 mapping for one serving cell (that is, one of tables 10.1.3.2-1, 10.1.3.2-2, 10.1.3.2-3, 10.1.3.2-5, or 10.1.3.2-6)) requires the use of a one serving cell resource allocation method. The Rel-10 implicit one serving cell resource allocation is used in our method if the PCell is not DTX. However, when the PCell is DTX, up to 4 PUCCH resources will be needed from the SCell. In Rel-10, ARI is used to allocate up to 4 PUCCH resources when a PDCCH is detected on SCell. Therefore, in our method, when a one serving cell mapping table is used and a PDCCH is detected on SCell, ARI (using the two power control bits in the SCell's PDCCHs) will indicate 2, 3, or, 4 PUCCH resources for sub-frames with Ms=2, 3, or 4, respectively. This has an advantage when one of the Mp and Ms equals to zero. For example, when PCell is UL/DL configuration 0 and SCell configuration 4, at sub-frame #3, Mp=0, Ms=4.

FIG. 9 is a flowchart showing an illustrative method 900 for adjusting the number and/or order of ACK/NACK bits. In this illustrative method, Mp is equal to the number of ACK/NACK bits for the primary cell, and Ms is equal to the number of ACK/NACK bits for the SCell. According to certain illustrative examples, assuming that HARQ-ACK$_1$(i) is an ACK/NACK bit for the serving cell with the larger bundling window size, and HARQ-ACK$_2$(i) is an ACK/NACK bit for the smaller bundling window size, and that both Mp and Ms are not equal and both non-zero, the method starts by setting 902 M equal to (Mp+Ms)/2 while rounding up if necessary. It is then determined 904 whether the larger of Mp or Ms (Mmax) minus the smaller of Mp or Ms (Mmin) is greater than one. If it is determined (904, NO) that Mmax−Mmin is equal to one, then an extra bit position is appended 906 to ACK/NACK bit set with length of Mmin. If, however, it is determined (904, YES) that Mmax−Mmin is greater than one, the method proceeds. The ACK/NACK bits are then set 908 for both cells as follows:

{HARQ-ACK$_l$(0), ..., HARQ-ACK$_1$(M−1)}
{HARQ-ACK$_2$(0), ..., HARQ-ACK$_2$(M$_{min}$−1), HARQ-ACK$_1$(M), ..., HARQ-ACK$_1$(M$_{max}$−1)}

It is then determined 910 whether the number of elements in {HARQ-ACK$_2$(0), HARQ-ACK$_2$(Mmin-1), HARQ-ACK$_1$(M), ..., HARQ-ACK$_1$(Mmax-1)} (illustrated as "X" in the flowchart) is less than M. If so (910, YES), then a bit is appended 914 to it as follows:

The UE shall append a DTX at the end of {HARQ-ACK$_2$(0), HARQ-ACK$_2$(M$_{min}$−1), HARQ-ACK$_1$(M), ..., HARQ-ACK$_1$(M$_{max}$−1)}

Two sets {HARQ-ACK$_1$(0), ..., HARQ-ACK$_1$(M−1)} and {HARQ-ACK$_2$(0), ..., HARQ-ACK$_2$(M$_{min}$−1), HARQ-ACK$_1$(M), ..., HARQ-ACK$_1$(M$_{max}$−1), DTX} have the same length and use the Rel-10 mapping table with a bundling window size of M.

Otherwise (910, NO), the method proceeds as follows to use 912 the two serving cell mapping table:

Else, two sets {HARQ-ACK$_1$(0), ..., HARQ-ACK$_1$(M−1)} and {HARQ-ACK$_2$(0),..., HARQ-ACK$_2$(M$_{min}$−1), HARQ-ACK$_1$(M), ..., HARQ-ACK$_1$(M$_{max}$−1)} have the same length, and the UE shall use Rel-10 two serving cells mapping table with M.

With methods described herein, reordering the ACK/NACK bits instead of filling up with DTX bits before using the existing ACK/NACK codebooks may be done. Assume that HARQ-ACK$_1$(i) is the ACK/NACK bit for the serving cell with the larger bundling window size, and HARQ-ACK$_2$(i) for the smaller bundling window size. M$_{max}$=max {Mp, Ms}, M$_{min}$=min {Mp, Ms}. This approach may also be described as follows, additionally comprising PUCCH resource allocation:

If Mp=Ms, the UE shall use one of tables 10.1.3.2-1, 10.1.3.2-2, 10.1.3.2-3, 10.1.3.2-5, or 10.1.3.2-6, resource allocation, and spatial bundling procedure directly.

Else if one of Mp and Ms is zero, the UE shall use one of tables 10.1.3.2-1, 10.1.3.2-2, 10.1.3.2-3, 10.1.3.2-5, or 10.1.3.2-6 and spatial bundling procedure for one cell with M=max {Mp, Ms} along with the revised one serving cell resource allocation described above.

Else

Rel-10 spatial bundling is used, where if Mp>1 or Ms>1, spatial HARQ-ACK bundling across multiple codewords within a DL sub-frame is performed by a logical AND operation of all the corresponding individual HARQ-ACKs within the cell whose M>1. HARQ-ACKs in PCell are not spatially bundled with HARQ-ACKs in SCell.

The UE shall use one of tables 10.1.3.2-1, 10.1.3.2-2, 10.1.3.2-3, 10.1.3.2-5, or 10.1.3.2-6 with M=ceil{(Mp+Ms)/2}, where Mp is the number of elements in set Kc for the primary cell and Ms is the number of elements in set Kc for the secondary cell.

if ($M_{max}-M_{min}$)>1, reordering the ACK/NACK bits into {HARQ-ACK$_1$(0), . . . , HARQ-ACK$_1$(M−1)} {HARQ-ACK$_2$(0), . . . , HARQ-ACK$_2$($M_{min}$−1), HARQ-ACK$_1$(M), . . . , HARQ-ACK$_1$($M_{max}$−1)} if the number of elements in {HARQ-ACK$_2$(0), . . . , HARQ-ACK$_2$($M_{min}$−1), HARQ-ACK$_1$(M), . . . , HARQ-ACK$_1$($M_{max}$−1)} is less than M, The UE shall append a DTX at the end of {HARQ-ACK$_2$(0), . . . , HARQ-ACK$_2$($M_{min}$−1), HARQ-ACK$_1$(M), . . . , HARQ-ACK$_1$($M_{max}$−1)}

Two sets {HARQ-ACK$_1$(0), . . . , HARQ-ACK$_1$(M−1)} and {HARQ-ACK$_2$(0), . . . , HARQ-ACK$_2$($M_{min}$−1), HARQ-ACK$_1$(M), . . . , HARQ-ACK$_1$($M_{max}$−1), DTX} have the same length and use the Rel-10 mapping table with a bundling window size of M.

Else, two sets {HARQ-ACK$_1$(0), . . . , HARQ-ACK$_1$(M−1)} and {HARQ-ACK$_2$(0), . . . , HARQ-ACK$_2$($M_{min}$−1), HARQ-ACK$_1$(M), . . . , HARQ-ACK$_1$($M_{max}$−1)} have the same length, and the UE shall use Rel-10 two serving cells mapping table with M.

Else, if ($M_{max}-M_{min}$)=1,

The UE shall append a DTX at the end of {HARQ-ACK$_2$(0), HARQ-ACK$_2$($M_{min}$−1)}

Two sets {HARQ-ACK$_1$(0), . . . , HARQ-ACK$_1$(M−1)} and {HARQ-ACK$_2$(0), . . . , HARQ-ACK$_2$($M_{min}$−1), DTX} have the same length and use the Rel-10 two serving cells mapping table with M.

If Ms=1 in any sub-frame, ARI on SCell will indicate 2 PUCCH resources ($n_{PUCCH,2}^{(1)}$, and $n_{PUCCH,3}^{(1)}$) using the mechanism defined in Rel-10, even if one spatial layer is transmitted on SCell. This step ensures that the required 4 PUCCH resources are available when one spatial layer is transmitted on SCell.

If Mp=1 in any sub-frame, implicit PUCCH resources ($n_{PUCCH,0}^{(1)}$, and $n_{PUCCH,1}^{(1)}$) are derived from $n_{cce}$ and $n_{cce}$+1 using the mechanism defined in Rel-10, even if one spatial layer is transmitted on PCell. This step ensures that the required 4 PUCCH resources are available when one spatial layer is transmitted on PCell.

Figure 10:
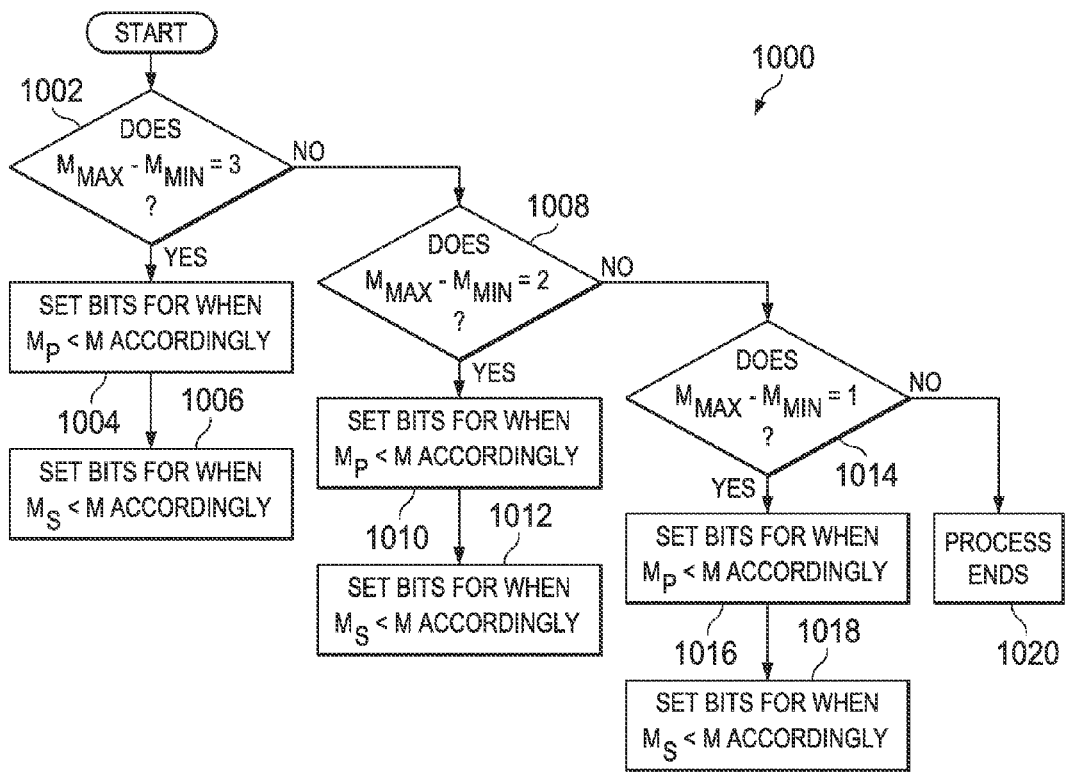
FIG. 10 is a flowchart showing an illustrative method for adjusting ACK/NACK bits, according to one example of principles described herein.

FIG. 10 is a flowchart showing an illustrative method 1000 for adjusting ACK/NACK bits. According to certain illustrative examples, the contents of HARQ-ACK$_1$(i) and HARQ-ACK$_2$(i) are determined as follows when Mp and Ms are not equal, and one of Mp and Ms is not zero. This approach strives to keep the maximum number of PCell bits in HARQ-ACK$_1$(i) and the maximum number of SCell bits in HARQ-ACK$_2$(i). Also, the HARQ-ACK bits with highest DAI index are bundled across cells.

It is first determined 1002 M if $M_{max}-M_{min}$=3. If it is determined (1002, YES) that $M_{max}-M_{min}$=3, then the bits are set as follows:

For Mp<M, the two sets of ACK/NACK bits are set 1004 as:
HARQ-ACK$_1$(i)={HARQ-ACK$_p$(0), . . . , HARQ-ACK$_p$(Mp-1), HARQ-ACK$_s$(Ms-1), DTX}, and
HARQ-ACK$_2$(i)={HARQ-ACK$_s$(0), . . . , HARQ-ACK$_s$(Ms-2)}

For Ms<M, the two sets of ACK/NACK bits are set 1006 as:
HARQ-ACK$_1$(i)={HARQ-ACK$_p$(0), . . . , HARQ-ACK$_p$(Mp-2)}, and
HARQ-ACK$_2$(i)={HARQ-ACK$_s$(0), . . . , HARQ-ACK$_s$(Ms-1), HARQ-ACK$_p$(Mp-1), DTX}

If it is determined (1002, NO) that $M_{max}-M_{min}$ is not equal to 3, then the method proceeds. It is then determined 1008 whether $M_{max}-M_{min}$=2. If it is determined (1008, YES) that $M_{max}-M_{min}$=2, then the ACK/NACK bits are set as follows:

For Mp<M, the two sets of ACK/NACK bits are set 1010 as:
HARQ-ACK$_1$(i)={HARQ-ACK$_p$(0), . . . , HARQ-ACK$_p$(Mp-1), HARQ-ACK$_s$(Ms-1)}, and
HARQ-ACK$_2$(i)={HARQ-ACK$_s$(0), . . . , HARQ-ACK$_s$(Ms-2)}

For Ms<M, the two sets of ACK/NACK bits are set 1012 as:
HARQ-ACK$_1$(i)={HARQ-ACK$_p$(0), . . . , HARQ-ACK$_p$(Mp-2)}, and
HARQ-ACK$_2$(i)={HARQ-ACK$_s$(0), . . . , HARQ-ACK$_s$(Ms-1), HARQ-ACK$_p$(Mp-1)}

If it is determined (1008, NO) that $M_{max}-M_{min}$ is not equal to 2, then the method proceeds. It is then determined 1014 whether $M_{max}-M_{min}$=1. If it is determined (1014, YES) that $M_{max}-M_{min}$=1, then a DTX bit is appended to the cell with the smaller number of ACK/NACK bits and the bits are set as follows:

For Mp<M, the two sets of ACK/NACK bits are set 1016 as:
HARQ-ACK$_1$(i)={HARQ-ACK$_p$(0), . . . , HARQ-ACK$_p$(Mp-1), DTX}, and
HARQ-ACK$_2$(i)={HARQ-ACK$_s$(0), . . . , HARQ-ACK$_s$(Ms-2)}

For Ms<M, the two sets of ACK/NACK bits are set 1018 as:
HARQ-ACK$_1$(i)={HARQ-ACK$_p$(0), . . . , HARQ-ACK$_p$(Mp-1)}, and
HARQ-ACK$_2$(i)={HARQ-ACK$_s$(0), . . . , HARQ-ACK$_s$(Ms-1), DTX}

In some examples, the UE can append an ACK bit instead of a DTX bit to make two HARQ-ACK sets with the same length.

If $M_{max}-M_{min}$ does not equal 1, and if $M_{max}=M_{min}$, then the process can end (1020).

This method also uses fewer ACK/NACK bits. Therefore it has good resource utilization and performance. For example, when the PCell is UL/DL configuration 0 and SCell configuration 2, at sub-frame #2, where Mp=1, Ms=4, the number of ACK/NACK bits will be M=ceil{(Mp+Ms)/2}=3, which means that the mapping table uses a total of six bits over both PCell and SCell.

Figure 11:
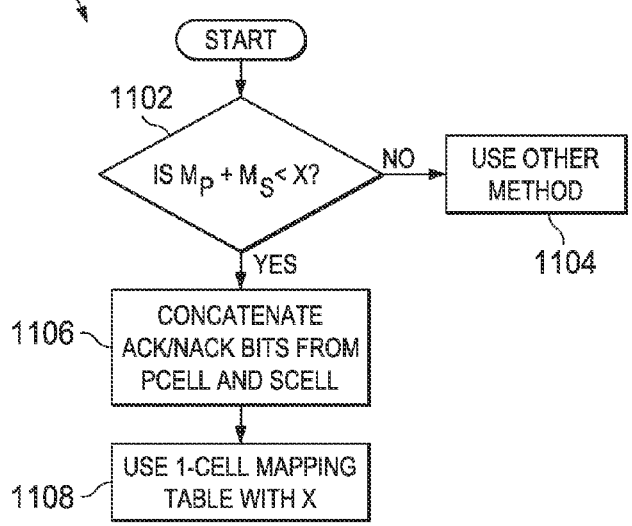
FIG. 11 is a flowchart showing an illustrative method for adjusting ACK/NACK bits, according to one example of principles described herein.

FIG. 11 is a flowchart showing an illustrative method 1100 for reducing the number of ACK/NACK bits. In this illustrative method, Mp is equal to the number of ACK/NACK bits for the primary cell, and Ms is equal to the number of ACK/NACK bits for the SCell. According to certain illustrative examples, it is determined 1102 if Mp+Ms is less than a predetermined number ("X"), e.g., $M_P+M_S$<5. For example, the number of ACK/NACK bits can be further reduced if they are arranged to use one serving cell codebook (one of tables 10.1.3.2-1, 10.1.3.2-2, 10.1.3.2-3, 10.1.3.2-5, or 10.1.3.2-6) when Mp+Ms is less than five.

If it is determined that Mp+Ms is not less than the predetermined number, then another method may be used 1104. If, however, it is determined that Mp+Ms is indeed less than the predetermined number, then the ACK/NACK bits from the PCell and the SCell can be concatenated 1106. The two serving cell mapping table with a bundling window of M=the value of the predetermined number can then be used 1108; as is discussed in more detail below.

Rel-10 spatial bundling is used, where if Mp>1 or Ms>1, spatial HARQ-ACK bundling across multiple codewords within a DL sub-frame is performed by a logical AND operation of all the corresponding individual HARQ-ACKs within the cell whose M>1. HARQ-ACKs in PCell are not spatially bundled with HARQ-ACKs in SCell.

If (Mp+Ms)<5,
the UE shall concatenate ACK/NACK bits from both PCell and SCell, {HARQ-ACK$_p$(0), . . . , HARQ-ACK$_p$(Mp−1), HARQ-ACK$_s$(0), . . . , HARQ-ACK$_s$(Ms−1)}
use the Rel-10 one serving cell mapping table directly.
Instead of using the resource allocation for one serving cell transmission, the resource allocation is done according to the methods used with ACK/NACK Tables (one of tables 10.1.3.2-1, 10.1.3.2-2, 10.1.3.2-3, 10.1.3.2-5, or 10.1.3.2-6)

Alternatively, ACK/NACK Tables (one of tables 10.1.3.2-1, 10.1.3.2-2, 10.1.3.2-3, 10.1.3.2-5, or 10.1.3.2-6) and the associated resource allocation may be used when Mp+Ms<5 and the greater of Mp or Ms<3. Through use of methods and systems described herein, ACK/BACK bit positions may be used more efficiently without requiring modification of standard codebook mapping tables.

While this disclosure contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations, one or more features from a combination can in some cases be excised from the combination, and the combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

The features described above may give rise to one or more advantages. For example, methods described herein enable support for carrier aggregation of cells that have different TDD UL/DL configurations while allowing for better performing transmission of ACK/NACK bits.

What is claimed is:

1. A method for transmitting Acknowledgement/Negative Acknowledgement (ACK/NACK) bits for carrier aggregation between a first cell and a second cell by a User Equipment (UE), the method comprising:
for a sub-frame, comparing a first number of ACK/NACK bits for the first cell with a second number of ACK/NACK bits for the second cell; and
if the first number of ACK/NACK bits for the first cell is less than the second number of ACK/NACK bits for the second cell,
adding an extra number of ACK/NACK bit positions to the first number of ACK/NACK bits, wherein the extra number is smaller than a difference between the first number and the second number;
transmitting, an ACK/NACK bit for the second cell using one of the extra number of ACK/NACK bit positions from the first cell, wherein the ACK/NACK bit for the second cell that is transmitted in the one of the extra number of ACK/NACK bit positions for the first cell comprises a DTX bit; and
reordering the ACK/NACK bit positions of at least one of an ACK/NACK bit position for the first cell or an ACK/NACK bit position of the second cell, wherein the reordering comprises transmitting a last ACK/NACK bit for the second cell using the bit position of one of a last ACK/NACK bit or a next to last ACK/NACK bit for the first cell, the last ACK/NACK bit for the first cell corresponds to a sub-frame on the first cell that is transmitted last to the UE, and the next to last ACK/NACK bit for the first cell corresponds to a sub-frame that is transmitted immediately prior to the sub-frame on the first cell that is transmitted last to the UE.

2. The method of claim 1, further comprising:
determining that sub-frames that correspond to the ACK/NACK bits for the first cell are of a different configuration than sub-frames that correspond to the ACK/NACK bits for the second cell.

3. The method of claim 1, wherein one of ACK/NACK bit positions for the first or the second cell is described in a table, the table associating combinations of ACK/NACK bits to ACK/NACK signals transmitted by the UE.

4. The method of claim 1, further comprising:
for the sub-frame, determining that the first number of ACK/NACK bits for the first cell is zero; and
indicating with an ACK/NACK Resource Indicator (ARI) a number of resources, the number of resources being equal to the second number of ACK/NACK bits for the second cell.

5. The method of claim 1, wherein the first cell is a primary cell and the second cell is a secondary cell.

6. The method of claim 1, wherein the second cell is a primary cell and the first cell is a secondary cell.

7. A user equipment (UE) for transmitting Acknowledgement/Negative Acknowledgement (ACK/NACK) bits to a first cell and a second cell, comprising:
one or more processors configured to:
for a sub-frame, compare a first number of ACK/NACK bits for the first cell with a second number of ACK/NACK bits for the second cell; and
if the first number of ACK/NACK bits for the first cell is less than the second number of ACK/NACK bits for the second cell,
add an extra number of ACK/NACK bit positions to the first number of ACK/NACK bits, wherein the extra number is smaller than a difference between the first number and the second number;
transmit an ACK/NACK bit for the second cell using one of the extra number of ACK/NACK bit positions from the first cell, wherein the ACK/NACK bit for the second cell that is transmitted in the one of the extra number of ACK/NACK bit positions for the first cell comprises a DTX bit; and reorder the ACK/NACK bit positions of at least one of: an ACK/NACK bit position for the first cell or an ACK/NACK bit position of the second cell; wherein the reordering comprises transmitting a last ACK/NACK bit for the second cell using the bit position of one of: a last ACK/NACK bit or a next to last ACK/NACK bit for the first cell wherein the last ACK/NACK bit for the first cell corresponds to a sub-frame on the first cell that is transmitted last to the UE, and the next to last ACK/NACK bit for the first cell corresponds to a sub-frame that is transmitted immediately prior to the sub-frame on the first cell that is transmitted last to the UE.

\* \* \* \* \*